(12) United States Patent
Reid

(10) Patent No.: US 7,786,999 B1
(45) Date of Patent: Aug. 31, 2010

(54) EDIT DISPLAY DURING RENDERING OPERATIONS

(75) Inventor: Glenn Reid, Woodside, CA (US)

(73) Assignee: Apple Inc., Cupertino, CA (US)

( * ) Notice: Subject to any disclaimer, the term of this patent is extended or adjusted under 35 U.S.C. 154(b) by 1118 days.

(21) Appl. No.: 09/680,107

(22) Filed: Oct. 4, 2000

(51) Int. Cl.
*G09G 5/00* (2006.01)
*G06T 13/00* (2006.01)

(52) U.S. Cl. ............ 345/581; 345/698; 345/557; 345/473; 345/474

(58) Field of Classification Search .......... 345/440.1, 345/711, 619, 473, 837, 698, 557, 581; 715/530, 715/514, 500.1, 726; 717/105; 109/246
See application file for complete search history.

(56) References Cited

U.S. PATENT DOCUMENTS

| | | | | |
|---|---|---|---|---|
| 4,937,685 A | * | 6/1990 | Barker et al. | 386/52 |
| 5,519,828 A | * | 5/1996 | Rayner | 715/723 |
| 5,638,504 A | * | 6/1997 | Scott et al. | 715/530 |
| 5,640,320 A | * | 6/1997 | Jackson et al. | 700/87 |
| 5,802,531 A | * | 9/1998 | Lamiraux et al. | 715/514 |
| 5,919,249 A | * | 7/1999 | Herbstman et al. | 709/246 |
| 5,937,144 A | * | 8/1999 | Wilkins et al. | 358/1.2 |
| 5,999,173 A | * | 12/1999 | Ubillos | 345/724 |
| 6,040,830 A | * | 3/2000 | Sahoo | 715/747 |
| 6,130,676 A | * | 10/2000 | Wise et al. | 345/619 |
| 6,215,485 B1 | * | 4/2001 | Phillips | 345/698 |
| 6,346,948 B1 | * | 2/2002 | Evans et al. | 345/582 |
| 6,463,444 B1 | * | 10/2002 | Jain et al. | 707/104.1 |
| 6,469,723 B1 | * | 10/2002 | Gould et al. | 345/837 |
| 6,501,476 B1 | * | 12/2002 | Gould et al. | 345/473 |
| 6,504,552 B2 | * | 1/2003 | Phillips | 715/726 |
| 6,633,888 B1 | * | 10/2003 | Kobayashi | 707/103 R |
| 6,686,918 B1 | * | 2/2004 | Cajolet et al. | 345/473 |
| 6,803,927 B1 | * | 10/2004 | Sahoo | 715/748 |
| 6,844,885 B2 | * | 1/2005 | Anderson et al. | 345/650 |
| 6,940,518 B2 | * | 9/2005 | Minner et al. | 345/557 |

OTHER PUBLICATIONS

Adobe After Affect Version 4.0, Jul. 15, 1999, selected pages, (http://proquest.safaribooksonline.com/0201658917).*

* cited by examiner

*Primary Examiner*—Jin-Cheng Wang
(74) *Attorney, Agent, or Firm*—Blakely, Sokoloff, Taylor & Zafman LLP

(57) ABSTRACT

A method of manipulating a time based stream of information to create a presentation is provided in which a processing system is employed. The methods include the rendering of a requested modification, such as adding of an edit feature, to the information in forming the presentation. A simulation of the modification is displayed for the user to observe during the rendering process. A proxy of the information having the changes is generated and shown on a display screen. Other aspects of the present invention relating to the processing system displaying edit information for a time based stream of information for use in authoring a presentation are also described.

36 Claims, 8 Drawing Sheets

EDIT DISPLAY DURING RENDERING OPERATIONS

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods for manipulating a time-based stream of information using a processing system, and more particularly to methods for displaying the time based stream of information during rendering of edits to produce a presentation.

BACKGROUND

There are many fields, such as entertainment, academics, business, health care, etc., that utilize media having time based streams of information. These time-based streams of information may be in the form of full motion images, e.g. video and movies; audio, e.g. music, sound effects, and voice/narration; motion graphics, e.g. animation; still images, e.g. text, pictures; and combinations thereof. The information is usually comprised of a stream of individual units, e.g. frames or blocks. Frequently, this information is in a digital format and resides on any of a number of conventional electronic mediums.

Oftentimes, the time-based information is assembled into a presentation through the use of a processing system to edit the information. For example, a video may be edited and combined with audio, text, effects and/or graphics to create a presentation. A "presentation" is any changed version of an original time-based stream of information or a modified copy of the original information. In addition, a "presentation" also may further be defined by at least one instruction for representing the original information in a changed form. In such an instruction-based presentation, the information is communicated in the manner according to the instruction. For instance, a software program may include directions on how a digital video should be played, where only certain frames of a video are chosen for display.

Digital editing typically is performed in a processing system and involves random retrieval of information from storage, communication of the information, e.g. display on a monitor, and manipulation of the information to produce the desired presentation. A portion or portions of sequential information, also referred to as a "clip," such as a continuum of segments, frame, block or footage, may be rearranged into a desired order. Typically, the presentation appears as a seamless flow of the edited information. Editing may further entail removing portions of clips. During editing, particular "edit features" may be added to the presentation, such as transitions between clips, special effects (e.g., black and white, brightness, contrast, texture, echoes, compositing, blurring, etc.), text, graphics, black background, silent audio segments, combinations of different types of time-based streams of information, such as audio and still images, and the like. Various types of editing may be performed as new techniques for altering raw information are created.

Traditionally, editing of multimedia to produce presentations involved complex techniques performed by trained professionals. However, recently novice users have become interested in making presentations, as well. The processing of multimedia to produce sophisticated home movies, web sites, business presentations, amateur movies, etc., has been gaining in popularity.

Given the currently diverse level of skills among authors of presentations, it is desirable to provide processing a system that is easy and convenient to operate. Such system should have sophisticated tools to simplify the editing process for the user.

Although previous authoring systems provide for varying levels of ease for the novice user, there are still several drawbacks to these systems. Some prior systems include Studio DV from Pinnacle Systems Inc. of Santa Clara, Calif.; Avid Cinema® from Avid Technology, Inc. of Tewksbury, Mass.; Adobe Premier® from Adobe of San Jose, Calif.; Dazzle* Digital Video Creator™ from Dazzle Multimedia of Fremont, Calif.; and DVgate™ from Sony Corporation of Tokyo, Japan.

In general, processing systems require that the time based stream of information be captured from a media source and entered into the system. The information and the newly created presentation are stored within memory of the system. Typically, the presentation is in the form of references that correspond to the stored information. The references have instructions on handling the information for the presentation. These processing systems permit the user to control what is included in the presentation by moving in and out points in a reference to indicate the segment or segments of information to be accessed. Thus, a presentation may include instructions regarding the portion of information in which output is to begin and the portion of information where the output is to cease.

In these instruction-based processing systems a user's edit choices are embodied by the reference(s). One modification to a reference is in the form of an edit feature that is added to the reference by a user. A reference with an edit feature represents a change of any unit(s) of the original information that entered the processing system. The user may make desired changes, e.g. adding of an edit feature, to a reference through a user interface shown on a display component of the processing system.

The edit features are incorporated into the presentation through a rendering process performed by the processing system, where references or portions thereof are modified and written into storage. The rendering of references often consumes much time and resources of the system. The rendering process takes longer as more information in the stream incorporates the edit feature.

One problem with some prior systems is that they are unable to display a view of the edited time based stream of information during the rendering process. Thus, the user must wait until rendering is complete to see what the edits will look like. The lack of immediate feedback is inconvenient and wastes time. Oftentimes, and especially with novice users, it takes multiple attempts at editing a segment of information before the desired modifications are achieved. However, with these previous processing systems, the user may not inspect the changes to determine if the edits are acceptable until after the rendering is complete.

Systems that attempt to show the rendered information may feed the information to the screen for display after it has been rendered, i.e. modified and written into storage. These systems are limited by the slow rate in which the information is rendered by the system. Thus, the depiction of the stream of edited information runs very slowly and poorly represents the modified information. Some prior systems attempt to speed up the rendering process by creating shortcuts, such as rendering only a small region of a unit of the information. However, such shortcuts have limited use and the showing of edits is still constrained by lengthy rendering processes.

In light of the shortcomings of the various currently available systems, there is a need for a method of creating a presentation of a time based stream of information that is quick and simple to perform. In particular, there is an interest for a processing system that outputs a view of the results of modifications during the rendering of such edits. Such a system would be continuously active as edits are made and yet would not hinder the rendering process.

SUMMARY OF THE INVENTION

In one embodiment of the present invention, a method for manipulating a time based stream of information in a processing system and for generating a presentation is provided. A user may input edit commands to modify the information in forming the presentation having one or a series of references. In response, the presentation is modified, such as an edit feature added, to create a revised presentation. During this rendering of modifications, a proxy of the revised presentation is also generated. The proxy is a simulation of the modifications that indicate how the modified presentation will appear once rendered. The proxy may be also displayed as the rendering takes place.

In one embodiment of the present invention, units of the presentation are displayed, which may include unedited units of the selected stream of information. When the system reaches a unit requiring modification during the course of showing the stream of information, instructions are sent for creating the proxy. Units of the unmodified version of the selected stream of information continue to be shown until the proxy or unit portions of the proxy stream are generated in time for it (them) to be displayed. In which case, the proxy is shown rather than the unchanged version of the information.

At times, the proxy is created by drawing an imitation of the edit feature to a proxy unit. Where the edit feature is text and the imitation may simulate the character, size and/or font of the edit feature being rendered by the system.

Often, the system includes a first software component that has instructions for adding the edit feature and the first software component is separate from a second software component that has instructions for creating the proxy. This second software component may be provided as a plug-in or ActiveX control.

Furthermore, the proxy may be displayed at a rate that is substantially less than the play rate of the time-based stream of information. For example, the display rate may be between 3 and 5 units per second for poorer quality displaying or be about 10 to 20 units per second for better representations.

A processing system may be provided for carrying out the described methods of displaying edited presentations. Among other components, the system has a display for showing the presentation and a processor for adding an edit feature to the presentation to create a revised presentation in response to a user edit command, creating the proxy of the revised presentation and displaying the proxy. In another embodiment of the processing system, there includes a means for adding edit features by a rendering process in response to a user edit command. A means for creating a proxy of the revised presentation and a means for displaying the proxy may also be provided.

According to still further embodiments, a computer readable medium may be provided that has stored therein a plurality of sequences of instructions, which, when executed by a processing system, cause the processor to perform a variety of processes to related to editing of the time based stream of information and generation of a presentation. The instructions command the processor to add an edit feature to the presentation to create a revised presentation in response to a user edit command, create a proxy of the revised presentation and display the proxy during the adding of the edit feature. In some cases, further additional sequences of executable instructions are provided, which, when executed by the processor, cause the processor to display units of the presentation in response to the user edit command and send instructions for creating the proxy when a unit requiring modification is reached. Of course, other embodiments may provide only the instructions themselves or methods of performing these steps. The benefits of the present invention are direct in that the display of edits as they are being performed by the system assists the user in recognizing how the finally rendered presentation would appear.

Other features and advantages of these and other embodiments are discussed in detail below.

BRIEF DESCRIPTION OF THE DRAWINGS

The present invention is illustrated by way of example, and not limitation, in the figures of the accompanying drawings in which:

FIG. 3A-3C illustrates examples of various areas of storage, wherein FIG. 3A shows one embodiment of an information storage area having clips of time based streams of information, FIG. 3B shows one embodiment of a reference storage area and FIG. 3C depicts one presentation storage area during generating of a presentation.

FIG. 5A-5C are examples of user interfaces for use in editing, according to one embodiment of the present invention, wherein FIG. 5A is a GUI showing a reference icon, FIG. 5B is a GUI showing controls for editing text into a presentation and FIG. 5C is a GUI showing controls for editing transitions into a presentation.

DETAILED DESCRIPTION

The methods described below are employed by an authoring tool configured to provide editing of a time based stream of information to generate a presentation. The processing system that may be utilized by the methods renders a modified presentation according to user edit commands by editing and storing the modified version of the presentation. The system also creates a proxy of the revised presentation while the rendering is in progress. The proxy is a simulated version of the modifications that may be displayed by the system at the same time that the presentation is being modified. Thus, rather than remain idle while the system is rendering, the user may view a simulation of the modified presentation and continue to work on the presentation. For example, the user may choose to accept or reject the modifications prior to the completion of the rendering procedure.

One modification to the presentation that requires rendering is the adding of an edit feature to one or more references or portion(s) of references that correspond to the time based stream of information. Edit features are any modifications that may be made to the units, e.g. frames, of the original time based stream of information for use in the presentation, that exist with current editing technology or may be created in the future. Edit features may include adding text, transitions, graphics, special effects (e.g. black and white, brightness, contrast, texture, echoes; compositing, blurring, etc.), black background, silent audio segments, overlays, three-dimensional images, audio, etc. Edit features may also include removing portions or characteristics of a unit. In one configuration, the edit features are provided by a plug-in or ActiveX control and made available to an editing application program used herein. The edit features available for use with the present invention may be changed and new edit features added to the processing system.

The time based stream of information and related presentation created by use of the processing system may be of any form, such as full motion images with audio, full images without audio, audio only, still images, motion graphics or any combination thereof.

Hardware Overview

Figure 1:
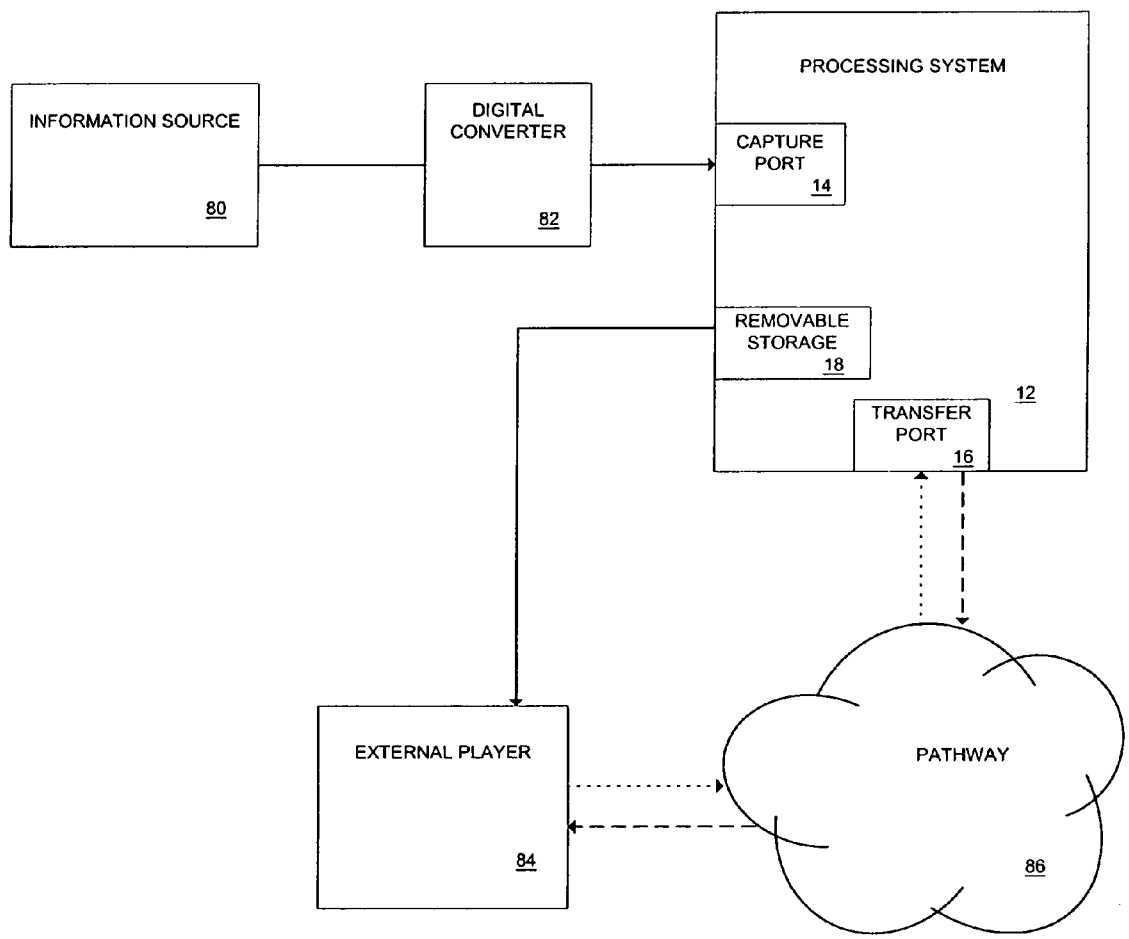
FIG. 1 illustrates one embodiment of an authoring environment in which a time based stream of information may be processed, in accordance with the teachings presented herein.

FIG. 1 illustrates an exemplary authoring environment 10 in which a time based stream of information may be processed to produce a presentation. A processing system 12, according to one embodiment of the present invention, is in communication with an information source 80 that has a time based stream of information at a capture port 14 (i.e. information collection interface) and optionally through an intermediate digital converter 82. Processing system 12 may read, copy, manipulate, store, delete, output, print and/or transfer information provided by source 80. An optional external player 84 receives communication from processing system 12, either indirectly from a transfer port 16 and through pathway 86, and/or directly through a removable storage medium 18. Although FIG. 1 demonstrates one layout of authoring environment 10, the scope of the present invention anticipates any number of information sources and players, coupled and arranged in various fashions and configured in accordance herewith.

The information source 80 is any type of device that generates and transfers data or data signals related to the time based stream of information. The information source 80 may be a photographic or full motion image capture interface such as a camera, camcorder, digital camera, etc.; a sound capture interface, such as a laser disc player (e.g. CD player), tape player/recorder, MP3 player, microphone, etc.; a keyboard; a scanner; a computer; a server; a computer program; the Internet, a sensor; any one of numerous available data collection devices; etc.

Figure 2:
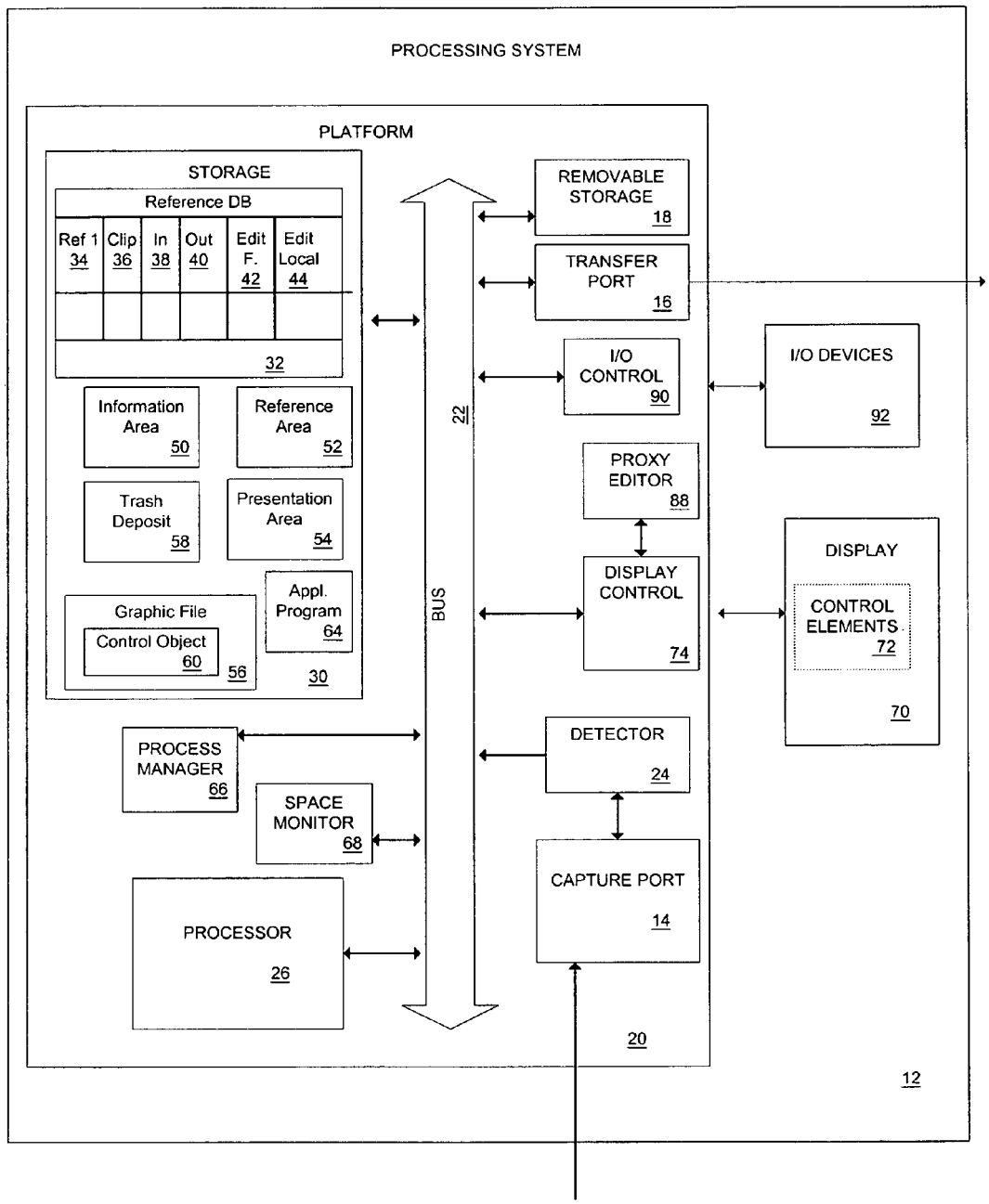
FIG. 2 is a block diagram of one embodiment of a processing system, configured in accordance with the teachings presented herein.

The information source may generate digital data signals and be communicatively coupled directly to the processing system 12. Alternatively, the information source may generate signals in a format other than digital, e.g. analog signals. As shown in FIG. 2, such non-digital data source may send signals to a digital converter 82 for changing the signals into a digital format prior to transfer of the data to the processing system 12. In another configuration, the information source 80 resides in the processing system, such as a software file having data that is imported to an editing application program employed by the present invention.

Communication between the information source 80 and the processing system 12 is often through means of a FireWire® (from Apple Computer, Inc. of Cupertino, Calif.), iLink or IEEE 1394 communication protocol. Where a FireWire brand protocol is employed, capture port 14 in the processing system may be a six-pin FireWire brand port. Also, a corresponding four-pin FireWire brand port may be present on the digital converter 82, where a digital converter is included, and/or on the information source 80. In this case, a six-pin-to-four-pin cable may be used to connect the ports of the digital converter 82 or information source 80 and processing system 12.

Other communication schemes are also suitable for transfer of data from information source 80 and/or digital converter 82 to the processing system 12, such as an Ethernet connection (i.e., capture port 14 may be an Ethernet port), serial interfaces, parallel interfaces, RS422 and/or RS432 interfaces, Livewire interfaces, Appletalk busses, small computer system interfaces (SCSI), ATM busses and/or networks, token ring and/or other local area networks, universal serial buses (USB), PCI buses and wireless (e.g., infrared) connections, Internet connections, and other communication links for conveying the time based stream of information from an information source 80 to the processing system 12. In addition, source 80 may store the information on a removable storage source, which is coupled to, e.g. inserted into, the processing system 12 and in communication with the capture port 14. For example, the source 80 may be a tape, CD, hard drive, disc or other removable storage medium.

Processing system 12 is any device configured to receive the time based information and manipulate the information to generate a presentation, e.g. a computer system or workstation. In one embodiment, the processing system 12 includes a platform 20, e.g. a personal computer (PC), such as a Macintosh® (from Apple Computer, Inc. of Cupertino, Calif.), Windows®-based PC (from Microsoft Corporation of Redmond, Wash.), or one of a wide variety of hardware platforms that runs the UNIX operating system or other operating systems. Often, the processing system 12 is configured to send the resulting presentation to an external player 84.

The external player 84 may be an IP host, a computer, a personal digital assistance (PDA), a server, a tape/CD/MP3 player, or other device that is configured to receive presentation information from processing system 12 and to display the presentation. In one instance of an authoring environment, the external player 84 is the same device as the information source 80, such as a camcorder. In still another case, no external player is provided and the presentation is played on the processing system and/or projected from the processing system onto a medium, e.g. a screen.

The external player 84 may receive information directly through removable storage 18 from the processing system 12. Removable storage 18 represents any of a number of detachable storage mediums, e.g. magnetic, optical, magneto-optical, tape, and/or other type of machine-readable medium or device for storing information. For example, the removable storage 18 may be a hard disk, a read-only or writeable optical CD (e.g. CD ROM, DVD), a disc, tape, etc.

External player 84 may also receive presentation information indirectly from the processing system 12, such as through a pathway 86. The communication pathway 86 may be through various networking mechanisms, such as a FireWire brand connection (or iLink or IEEE 1394 connection), LAN, WAN, telephone line, serial line Internet protocol (SLIP), point-to-point protocol (PPP), an XDSL link, a satellite or other wireless link, a cable modem, ATM network connection, an ISDN line, a DSL line, Ethernet, or other communication link between the processing system and external player.

The processing system has components for handling time based information in various ways. As shown in FIG. 2, these components include a capture port 14 for acquiring the information, a storage 30 for holding the information and editing tools, a processor 26 for manipulating the information, a process manager 66 for instructing the processor on editing and storage of information, a display 70 for showing the information and a user interface and possibly a transfer port 16 or removable storage 18 for sending the information so processed. Upon review of this specification, it will be appreciated by those skilled in the art that the components of processing system 12 may be connected in various ways in addition to those described herein.

Now referring in more detail to the components shown in FIG. 2, processing system 12 includes processor 26, which may represent one or more processors. Some exemplary processors are a Motorola Power PC processor, an Intel Pentium (or x86) processor, etc. The processor 26 may also be a microprocessor. The processor 26 runs an operating system and applications software that controls the operation of other system components. The processor may be configured to perform multitasking of several processes at the same time.

Storage 30 is coupled to processor 26 by a bus 22. The storage 30 may be a dynamic random access memory (DRAM) and/or may include static RAM (SRAM). Typically the storage is a hard disk drive, but may alternatively be another magnetic disk, a magneto-optical disk or other read/write device. The processor may also be coupled to other types of alternative storage areas that may be considered as part of the storage 30 or separate from the storage 30. Such alternative storage areas may include cache, flash memory, etc., and which may also be considered the removable storage 18. Usually storage 30 has a capacity in the megabyte to gigabyte range, and more typically, at least 64 megabytes capacity and can sustain throughput of at least 7 megabytes per second of information. However, as technology advances, the capacity of the storage may increase.

Figure 3A:
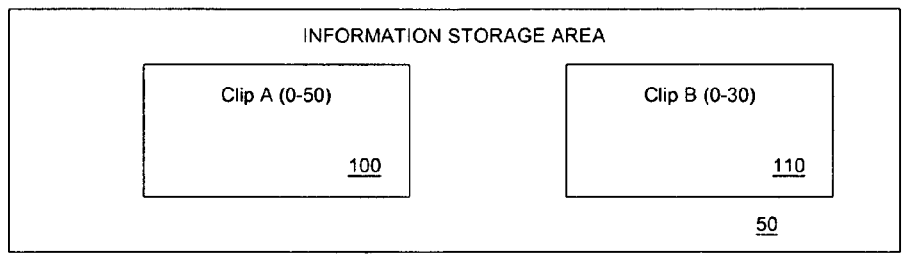

The storage 30 contains the acquired time based stream of information within files as well as executable code that provides functionality for processing the time based stream of information in accordance with the present invention. The time based stream of information is stored within files in an information storage area 50. One exemplary information storage area 50 is depicted in FIG. 3A as having a segment of a time based stream of information, clip A 100 with units (0 to 50), and another fragment, clip B 110 having units (0 to 30).

The storage also includes at least one and usually multiple references that has data, e.g. instructions, on how the processor is to read and/or manipulate the stored information. Typically, a reference is an object that corresponds to an individual clip of information. The reference data include at least one in-point that specifies where the processor is to start accessing the stream of information and at least one out-point that identifies where to stop access of the information. The reference data may also contain instructions on adding particular edit features to a presentation that are in addition to the stored information and location data on where such edit features are to be presented in the time based stream of information.

Figure 3B:
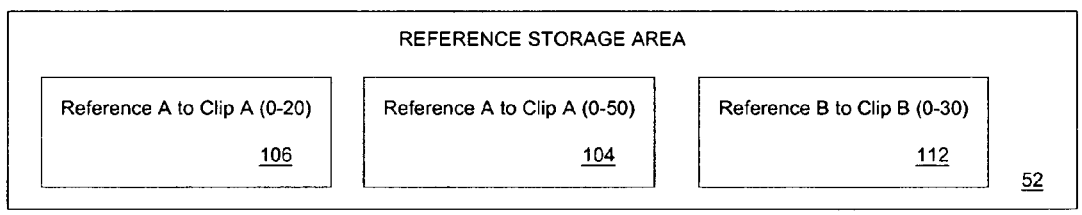

The storage may have a reference storage area 52 to contain references with reference data. One embodiment of storage areas 52 representing edited references is shown in FIG. 3B, where reference storage area 52 corresponds to the information of FIG. 3A with modified reference A1 (0 to 15) 106 corresponding to clip A, but only from units (0 to 15) 100, a copy reference A2 (0 to 50) 104 and reference B (0 to 30) 112 corresponding to clip B units (0 to 30) 110.

The stored references are indexed in a reference database 32 within the storage 30. Each entry 34 in the database is to a reference and provides various data found within the reference, such as the associated clip 36, an in-point 38 and an out-point 40. For example, a reference (1) may indicate clip (A) with an in-point at frame (0) and out-point at frame (60). The database may also include other reference data that assists in generating a presentation.

Figure 3C:
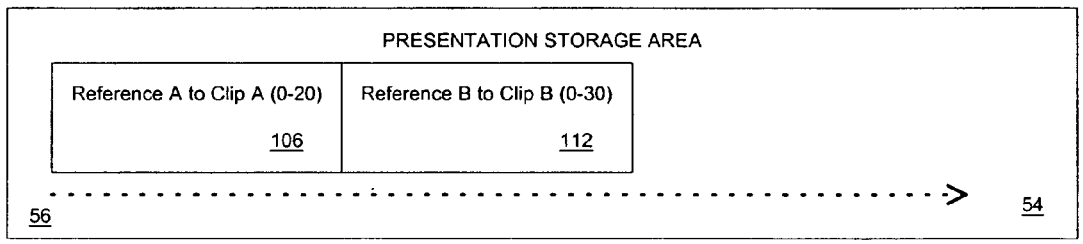

The presentation that is generated by the processing system, as represented by the references, is stored in presentation storage area 54. The presentation storage area includes data related to when the information is to be displayed along a presentation time line 56. One presentation storage area 54 that draws upon the pool of reference data from FIG. 3B is shown in FIG. 3C and begin with reference A1 (0 to 15) 106 corresponding to clip A units (0 to 15) 100 and immediately followed by reference B 112 corresponding to clip B units (0 to 30) 110.

A process manager performs the various tasks that control the rendering of edits and storage of information and reference data. A process manager 66 is shown in FIG. 2 coupled to storage 30 and processor 26 through bus 22. During the capturing of information, process manager 66 may allocate space on the storage for keeping a new information file. During the edit process, the process manager sends instructions to the processor to manipulate stored data in a variety of ways to form the desired presentation. Upon receiving a user command to perform modifications to a presentation, the process manager may direct the processor to read the appropriate information from storage 30, render the edits by altering the references, e.g. adding an edit feature to the reference, and write the modified reference into the storage 30.

The process manager receives selection commands, for instance from a user input or software instructions, and responds by selecting the appropriate information and/or reference, which may be an entire file of information/reference or portions thereof. In return of an edit command, there are numerous editing tasks that may be performed by the process manager, some of which are described in the examples below. The exemplary editing methods so described may also be applied to adding any type of editing features to the presentation, such as text, transitions, audio, graphics, etc.

Example 1

Rendering of Edit Features

In one method of adding edit features to a clip during the processing of a presentation, a reference A1 corresponding to clip A (0 to 50) is provided. The reference A1 is copied to create a duplicate reference A2 (0 to 50). Usually, selected edit features may be added to either the beginning (first frame) or ending portions (last frame) of the clip represented by the original or the copy reference. Where the edit feature is intended for the beginning or ending unit(s) of a reference, the feature is simply inserted in the reference and the reference having the edit feature is placed in the presentation storage area. Movement of the reference may be through the cut and paste methods described above or by a user command to drag and drop the reference in place.

In the alternative, text may be intended for a middle portion of a clip. The reference A2 (0 to 50), that is targeted for text editing is split at the location (between unit 25 and 26) for the text by copying to the reference and forming reference A2(*a*) (0 to 50), and reference A2(*b*) (0 to 50). The in and out points of the references are modified to reflect the split to reference A2(*a*) (0 to 25) and reference A2(*b*) (26 to 50). The text may be added to the beginning unit(s) or ending unit(s) of the split reference 152 and the edited reference added to the presentation storage area 154. The text may be added to the last unit of reference A2(*a*) at 25 and may additionally be included in any sequential units previous to 26 without skipping any units in the timeline. It is also possible to add the text to reference A2(*b*) starting at unit 26, and to any sequentially following units without skipping any such units.

Once the requested changes are made, each modified reference is written into storage in the reference storage area 52 and/or presentation storage area 54.

Example 2

Cut and Paste Editing

For one method of cutting or copying a portion of a clip during the processing of a presentation a first reference is initially provided, such as reference A1 corresponding to clip A (0 to 50). Next, the processing manager copies the reference A1 to create a duplicate reference A2 (0 to 50). The process manager changes the reference data of either the original or copied reference to reflect edit command requests where the in point and out point of reference A2 are modified to (0 to 20). The process manager places modified reference A2 onto a paste board for inserting into a presentation. The reference data that is present in the paste board may be inserted at any point in the presentation along the time line in presentation storage area. If the reference is to be placed prior to or after another reference, already present in the presentation storage area, or if there are no other references provided in the presentation storage area, the reference is simply pasted into the storage area. On the other hand, where the reference is to be nested within another reference, third reference B1 (0 to 30), the reference B1 (0 to 30) is first split at the point where insertion is to occur (unit 15) by copying the reference B1 (0 to 30) to create reference B2 (0 to 30). The in and out points are changed so that the reference B1 (0 to 15) corresponds to the first clip portion prior to the inserted reference A2 and the reference B2 (16 to 30) corresponds to the second clip portion following reference A2. The modified reference A is then pasted between the two reference B's in the presentation storage area.

In subsequent steps, the cut and paste process may be undone to retrieve the original data. For example, reference A2 may be deleted in response to a deletion command and reference A1 is preserved. The continuum time line between reference B1 and B2 is also restored such that there is no gap where reference A2 had previously been positioned. Although referenced B1 and B2 may remain split, the two references run seamlessly to appear as though there is a single reference to the clip.

In order to show the on-going edits made to the presentation and the tools required to make such edits, the processing systems has a display control 74, e.g. video board, coupled to the processor 26 through bus 22, as illustrated in FIG. 2. The display control 74 communicates with the display 70 in the processing system 12 to couple the display 70 to the platform 20. Display 70 may be any one of a number of conventional display devices such as a liquid crystal display, cathode ray tube, plasma display, video display, or other type of display device. For sharp colors and grayscale, display 70 may be an SVGA monitor, with a resolution of 800×600 (26 dpi) or better, with an active area of at least 15 inches, and may be controlled using a true color video card. The editing data may be depicted on a graphical user interface (GUI) that is shown on the display.

Figure 4:
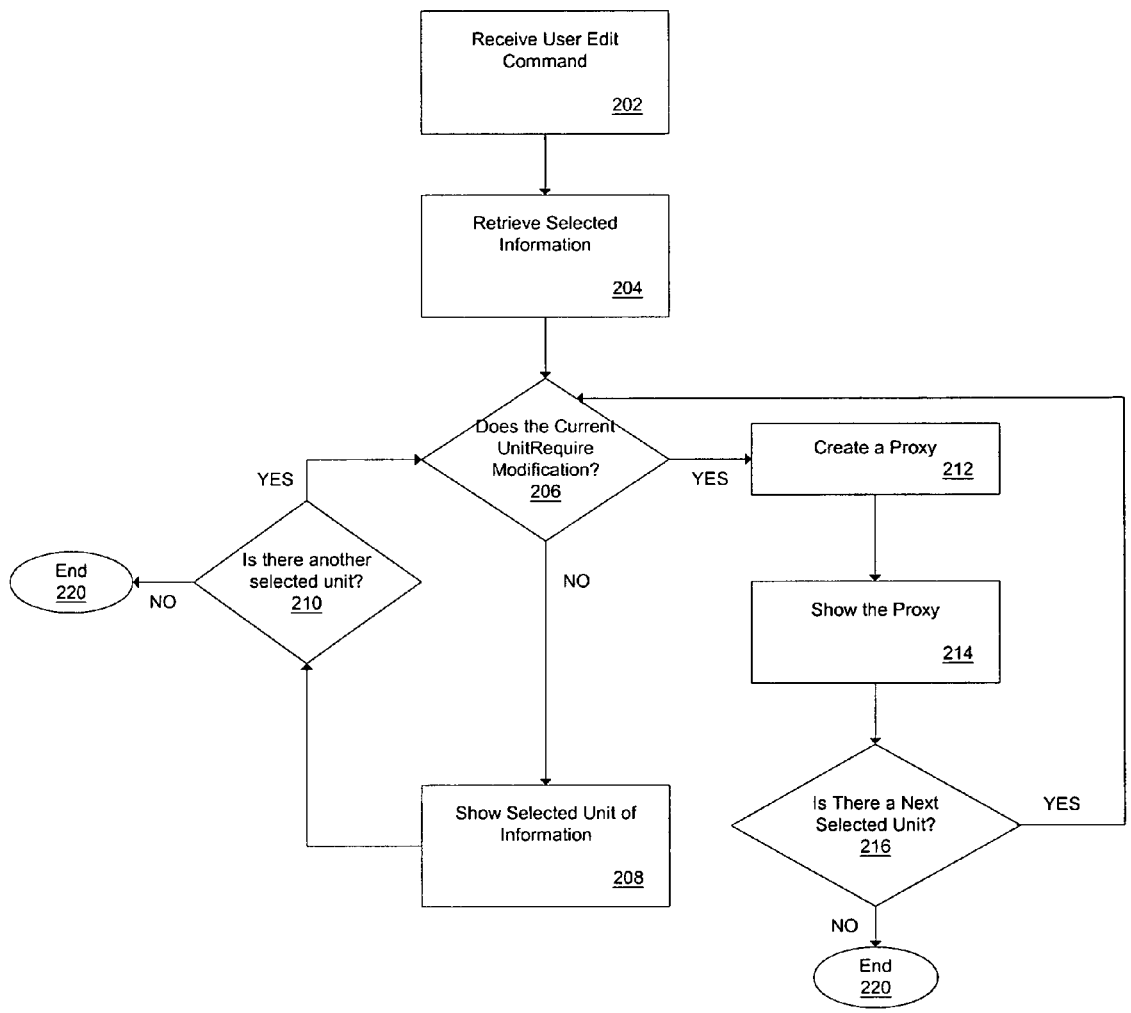
FIG. 4 illustrates a flow chart depicting one method for displaying modifications during rendering, according to the present invention.

According to the present invention, the processing system may output a version of a modified presentation while it is rendering the edits. One method used by the processing system to display edits is shown by the flow chart in FIG. 4.

When the system receives an edit command 202, such as directions to add an edit feature, including a selection of the information that is to be modified, the display control 34 permits the display of the edited information while the system renders the modifications via the process manager 66. The edit command may have directions to change all or any portion of the stream of information corresponding to the selected reference. In any case, each unit of the selected reference is shown including as much of the modified version of the units as possible.

The display control 74 queues the initial information unit of the selected reference, usually by pulling the selected reference and/or its associated information from storage 204. The display control then determines whether the unit requires modification according to the edit command 206. If no modification is needed, the display control 54 directs the display 70 to show the unit of information 208. The display control establishes whether another unit is in the stream of information indicated by the reference 210 and either repeats the process for the next unit or ends 220. As soon as the display control hits a unit that is in need of modification, display control sends a request to a proxy editor 88 to create a pseudo rendered version of the edits, referred to as a "proxy" 212.

The proxy editor 88 directs the processor to simulate the edit feature on the appropriate units of the selected reference. Usually, this pseudo rendering by the proxy editor runs asynchronous with the rendering of edit features directed by the process manager. Thus, the processor of the system may multitask the rendering of edits and creating of the proxy. In another embodiment, multiple processors are present to execute the simultaneous rendering and proxy generation. The creating of the proxy may be performed according to a software component, e.g. proxy editor, that is a separate entity from the software component, e.g. process manager, that instructs the rendering of presentation modifications.

The proxy may imitate the edit feature that is actually being rendered through the process manager. For example, where the edit command calls for adding of text to a unit or series of units, the proxy editor 88 draws letters to the unit(s) to fake the text rendering conducted by the program manager. The proxy editor 88 may instruct the mimicking of the character, size, font and otherwise appearance of the text. In another configuration, to add transitions and other edit features to a unit, the proxy editor may charge the processor to make the changes to the unit in the same manner as the actual rendering. However, rather than writing the changes to storage, the modified unit is simply sent to the display control for display 214. Since this writing step that is performed in the rendering process is skipped, the pseudo rendering of the proxy consumes much less time than it takes for the rendering. The display control then determines whether a next selected unit is present in the stream 216 and reiterates the process described above if a next unit is found, or else ends the loop 220.

Typically, the display control continues to show each unit of the stream of the selected reference and shows the proxy if the proxy is received by the display control in time. However, if the unit represented by the proxy has already been shown, the display skips the showing of that proxy unit and only shows the proxy units that arrive at the display control prior to the showing of the corresponding unit. The display control continues showing the unmodified units from the proxy until the display control gets handed a pseudo rendered unit in time to show it. Thus, there may be some units that are missed from being shown, until the proxy editor catches up.

Typically, the process of pseudo rendering is slow enough to permit some or all of the proxy units to be displayed. The creating of the proxy consumes some of the system's resources and oftentimes this consumption forces the display control to reduce the rate of showing the information. Thus, the slow display rate usually allows time for the pseudo rendering to catch up with the display. Even a few of the modified proxy units presented on the display assists the user in recognizing how the finally rendered presentation would appear.

Usually, the output rate, e.g. display rate, of the proxy is substantially less than the play rate of the time-based stream of information. The play rate is often set by standards. For example, the play rate of NTSC video NTSC (system that may be used in North America and Japan), is about 30 units per second, or 29.97 units per seconds. For PAL systems (systems that may be used in parts of Europe, China and Hong Kong) the play rate is about 25 fps. The display rate depends, inter alia, on the capacity of the processing system, the type of edit feature, the number of units requiring rendering, the size and complexity of the edit feature, etc. In one embodiment, the display rate is between about 3 and 5 units per second, e.g. for transition rendering. In another embodiment, the display rate between about 10 and 30 units per second, e.g. for title rendering in a NTSC system. Nevertheless, even a poor quality display may provide enough of a simulation of the edit for it to be useful to the user.

The user directs the editing process by employing control elements, i.e. editing tools, that are provided by the processing system to maneuver the references. Typically, at least some of the control elements are displayed on the user interface. For example, one control element is in the form of an extended window, referred to as a time line or track. Such time lines represent the time course of a presentation and the position of each reference element along the time line dictates the order of the associated clip and edit feature in the presentation. Other control elements include edit windows that may permit edit features to be added to the references, windows for viewing the presentation or portions thereof, menus, buttons, etc.

At least one and usually a plurality of control elements may be presented by the processing system. Some of the controls may be non-interactive, e.g. panes, and simply assist in viewing other control elements, reference elements, clips, etc. Various other control elements are interactive and may be activated by the user or by other means, such as by software instructions, to create control commands.

A user may activate control elements through input/output device 92. In order to input commands and output responses, the processor 26 of the processing system 12, shown in FIG. 2, is coupled by bus 22 to an input/output (I/O) control 90. The I/O control 90 commands one or multiple I/O device(s) 92. Some conventional I/O devices are key boards, mouses/trackballs or other pointing devices, microphones, speakers, magnetic disk drives, optical disk drives, printers, scanners, digital cameras, etc. There are a variety of interactive mechanisms to activate the control elements, such as keyboard input, voice command, mouse manipulation, text entry, pen-to-text data entry device, touch screen, network signals, satellite transmissions, preprogrammed triggers within the system, instructional input from other applications, etc.

The control elements respond to activation by sending instructions to the processor. For example, a processing control element conveys directions to the processor regarding how a clip is to be treated or displayed. Each control element includes properties that describe how it will react when selected by the user or other means.

The processing system may contain any number of different types of control elements. All of the control elements described herein are by way of example and are not intended to limit the choices that are or may become available in the art.

Some forms of control elements that are visible on the screen are buttons, "pop-up" or pull-down menus, scroll bars, panes and iconic images. Other control elements may be invisible to the screen and thus are not included on the GUI. Control elements that are not visible on the screen, may be present on input/output devices, such as a keyboard that is in communication with the I/O control. For example, a space bar on a keyboard may also be depressed to start capture and depressed again to stop capture of the information on the fly while playing the time based information during capture mode.

The table shown below describes other control elements that may be present on the keyboard, where the items in the "action" column describe the command activated by depressing the keyboard button and the items in the "shortcut" column are the corresponding keyboard buttons.

| Keyboard shortcuts Navigation | |
|---|---|
| Action | Shortcut |
| Play/Stop and Start/Stop Capture | Space Bar |
| Play-head to Beginning of Movie | Home |
| Play-head to End of Movie | End |
| Forward One Frame | Right Arrow |
| Forward Ten Frames | Shift + Right Arrow |
| Roll Play-head Forward | Hold Down Right Arrow |
| Search Forward (fforward) | Command + ] |
| Back One Frame | Left Arrow |
| Back Ten Frames | Shift + Left Arrow |
| Roll Play-head Backward | Hold Down Left Arrow |
| Search Backward (rewind) | Command + [ |
| Selection | |
| Multiple Selection | Shift + Click Item |
| Multiple Selection (range) | Click 1st item then Shift + Click last item |
| Moving/Cropping | |
| Move Audio Clip | Click Clip + Left or Right Arrow |
| Move Audio Clip Ten Frames | Click Clip, then Shift + Left or Right Arrow |
| Move Crop Marker | Click Marker + Left or Right Arrow |
| Move Crop Marker Ten Frames | Click Marker, then Shift + Left or Right Arrow |
| Accept/Cancel | |
| Accept Dialogs (OK) | Return |
| Cancel Dialogs | Esc or Command + C |
| Cancel Rendering | Command + . (period) |
| Volume | |
| Increase System Volume | Up Arrow |
| Decrease System Volume | Down Arrow |
| Titling | |
| Move Between Text Fields | Tab |
| File Menu Functions | |
| New Project | Command + N |
| Open Project | Command + O |

-continued

| Keyboard shortcuts Navigation | |
|---|---|
| Action | Shortcut |
| Save Project | Command + S |
| Export Movie | Command + E |
| Save Frame As | Command + F |
| Import File | Command + I |
| Quit | Command + Q |
| Edit Menu Functions | |
| Undo | Command + Z |
| Redo | Shift + Command + Z |
| Cut | Command + X |
| Copy | Command + C |
| Paste | Command + V |
| Crop | Command + K |
| Split Clip at Play-head | Command + T |
| Select All | Command + A |
| Select None | Command + D |
| Help Menu Functions | |
| Imovie Help | Command + ? or Help key |

In general, the GUI has numerous innovations that allow a user to easily make edits and create a presentation. An exemplary GUI 230 for displaying various data related to both the capture of the information and processing of the information is depicted variously in FIGS. 5A to 5C. The present invention frequently has a single GUI to display enabled, i.e. operable, capture information and enabled, i.e. operable, process information. Such a GUI is functional for both capture and edit procedures, thus avoiding the necessity of switching to multiple GUI's to view and work with information relating to capture and information relating to the processing of the presentation. Any convenient portions of the screen may be used to show the capture and process information without the user needing to toggle between screens.

Figure 5A:
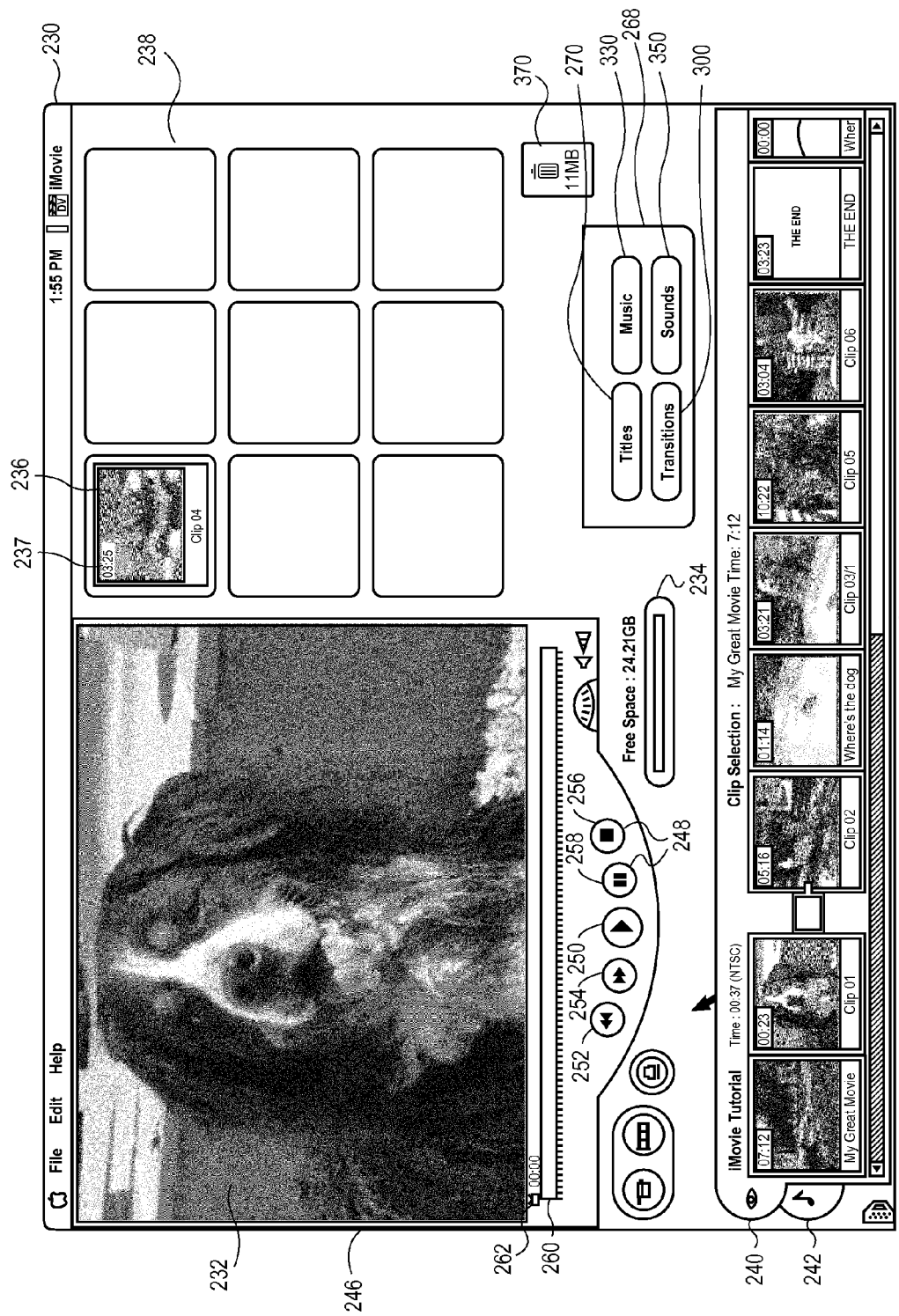

As shown in FIG. 5A, the process information displayed on the GUI 230 may include at least one object reference element 236, e.g. icon, with each reference element 236 being associated with a reference in storage that has data for a clip of the time based information contained in storage 30. Typically, the reference element 236 is displayed as a "thumbnail" in the form of a still image of the first frame of the associated clip. Where the reference has an edit feature, a description or depiction of the edit feature may also be included on the reference element, such as a portrayal of the edit feature 350, or a particular shape, size or texture to indicate the edit feature. For example, a reference to a transition may be in the form of a box 352.

Typically, control elements in the form of one or more windows are present in the GUI, which may be opened by processor 26 or by the user. One such user interface illustrated in FIG. 5A has several windows, such as a monitor window 246, time line 240 and edit box 268. The monitor window 246 may be the viewing portion of the display that shows the edit output. Various other windows may be present on the display of the processing system to provide at least one control element.

At any time during the edit process, the system may produce an edit output to reveal stored clips of the time based information for processing/editing e.g. the clip associated with a reference element may be viewed on the monitor window 246. The edit output may depict how the clips would appear in presentation after editing is complete. As described above, the edit output may be provided during the rendering process. To view the information, a reference element may be selected and dragged/dropped or cut/pasted onto the monitor window. However, such these actions do not necessarily result in the reference element being removed from its current place on the GUI, but simply allow the information to appear on the monitor window.

Similarly, the GUI may also be used to present a depiction or replay of the time based stream of information (referred to as a "capture output"), as well as other characteristics of the information that is being acquired. The capture output sets forth the current frames that are being received and read, such as newly acquired information that is present in a proxy, i.e. buffer, prior to being written into storage. During the capture mode, the monitor window 246 may exhibit the capture output of the time based information. By the dual use of the monitor window 246 for both edit output and capture output, the screen area is conserved and the user interface is simplified.

A monitor window time ruler 260 depicts where the play-head 262 as it travels along the course of the clip. A variety of output controls 248 may be used to move the play-head to various positions on the clip. When the play-head is at the frame of interest, the pause control 258 may be activated and the frame edited. In this manner, particular portions of information may be selected by the user and the system may be further instructed to edit the selected portion, e.g. deleting the selected portion from storage.

Output controls 248 are one set of control elements that implement how the user chooses to view or listen to the information from the system. Output control elements may direct the showing of the information on the monitor window 246, the playing of information through audio speakers, or output through other convenient devices in communication with the system. In one embodiment, the output controls are enabled during rendering to control the display of the modified information, e.g. proxy. There are several types of output controls 248 that may be provided by the processing system.

The output controls 248 may be used to move the play-head (i.e. pointer to indicate the location in the information available for use) to particular sections of the information stored in the storage. One such output control is a play control 250 that directs the system to play or show the information. Other kinds of output controls include a rewind control 252 and a forward control 254. The play-head may be jogged backward by the user depressing the rewind control 252 to shuttle the play-head in reverse direction. The output of information is advanced by the user selecting the forward control 254 during playback to shift forward at faster than the normal play rate, e.g. double the speed. Also provided by the processing system may be a stop control 256 for ceasing the output action and a pause control 258 for temporarily suspending the movement of the information from the system. In practice, the stop control 256 may be selected and then the rewind control 252 or forward control 254 selected to quickly skip forward or backwards through the footage.

In one method of outputting the time based information through the use of output controls, the play control 250 is activated and then the rewind control 252 or forward control 254 chosen to move to a position that is immediately prior to the appropriate position for capture. The stop control 256 is selected and the play control 250 is reactivated. When the scene of interest is displayed or a particular portion of audio is played, the clip may be edited.

Several additional output controls may also be employed for alternative ways of communicating the information. For example, a full screen mode control 252 may be provided to permit the presentation to be shown in a window that spans the entire area of the display. Also, some control elements may adjust the quality of playback. A preferences option with a playback tab (not shown), and an edit pull down menu 254 are some optional quality controls. In addition, a sound control knob 256 functions to adjust the intensity of audio.

A smooth motion control may be present to allow the user to create a smoother playback than would be typically expected. Usually, the bandwidth necessary to display digital video requires that visual quality be compromised in order to deliver a high number of frames per second (fps) during playback. Also, a better image control may be included to provide a crisper playback and more detail from each frame displayed. Such option for a better image is often at the expense of motion quality. The number of frames per second that may be displayed is dependent on the processing power of the system, where higher power results in higher frame rate and playback that is less choppy.

Further to the GUI, a time code 237 may also be provided to indicate the length of a clip. In addition, a space monitor element 234 may show the amount of storage space remaining or amount of space consumed by stored information.

Still other control elements may receive reference elements in order to manipulate the references in forming segments of a presentation. The user may input commands to select and relocate reference elements 236 or portion(s) thereof, to the several windows and portions on the GUI, such as a shelf 238, a video time line 240, an audio time line 242 or other portion of the display. One typical way for a user to select a reference element is by pointing a cursor on the reference element and clicking on it, such as via a mouse or keyboard stroke. However, a user may use other tools for selection such as menu choices, voice instructions, etc. A selected reference may be indicated on the GUI by a highlighted border 354 around the reference.

In one embodiment, a reference element is moved to various portions of the display by moving a pointer 356, e.g. cursor, over the reference element and dragging the reference element to another portion of the display. The reference element is dropped over the intended spot on the GUI by releasing the pointer from the reference element.

Another means to move a reference element is through a cut and paste command. The reference element is selected and is made to disappear from the screen by activating a cut command. Activation of the cut command may occur by the user choosing a menu option, keyboard stroke, etc. An intended place for the relocation is selected and a paste command activated to prompt the reference element to reappear in the selected place.

In addition, other functionalities may be provided by the processing system to relocate the reference element on the GUI, such as mouse clicks, keyboard commands, menu options, various types of control elements, etc.

The reference to each clip that is to be included in the presentation is usually positioned in the presentation by arranging the reference element(s) along a time line 240, 242 in the order that the associated information will appear in the presentation. The graphical representation of a visual time line 240 is for adding visual information, such as the time based stream of information in the form of full motion images, e.g. video and movies, motion graphics, e.g. animation, as well as still images, e.g. text, pictures, combinations thereof, and the like. The graphical representation of an audio time line 242 is for including audio information, such as music, sound effects, and voice/narration, etc. to the presentation. A user may opt for the audio synch time line to automatically display the references for each incoming stream of information. For example, the user may choose a preferences control from a menu and select to have the references appear in the audio synch time line rather than the shelf portion of the user interface. The data corresponding to the time lines is stored in presentation storage area within the system.

Often, the processing system includes functionality to display and use only a single visual time line 240 which is capable of handling any type of edit feature and other visual information. The visual time line may include visual reference elements with any combination of the edit features to be included in the presentation. Where it is desired for an edit feature it be nested in another reference (i.e. clip), the reference element may be split into two reference elements and the reference element having the edit feature is positioned between the two on the time line. A time code 237 may be provided that indicates the length of a clip associated with the reference. Furthermore, the time line may include the total time 358 of the presentation. The time line also may have a scroll bar 360 to move up and down the length of the time line, so that the time line is not limited by the space provided by the display.

Edit features may be conveniently added to a presentation by use of an edit box 268 that includes various editing control options, such as titles control 270, transitions control 300, music control 330 and sound control 350. Specific sub-windows having edit controls may be included for the various edit features contained in the edit box. In one embodiment, a sub-window pops-up on the GUI by activating an edit control option, e.g. by a mouse click. The sub-windows may also be retrieved by selecting an existing reference that has an edit feature. Upon selecting such as reference, the sub-window to the reference's edit feature automatically appears on the screen for use in further editing. These pop-up windows save screen space and create an easy editing environment for the user.

Title control 270 includes instructions for adding text, such as headings, labels or captions to a clip. Selection of the title control 270 opens a title window 274 as shown in one embodiment in FIG. 5B. A transition time ruler 276 may be provided to show the length of the selected clip and the position of the play-head 278. The user may navigate the play-head to various frames in the clip by positioning a cursor over the play-head through use of a mouse, or using other cursor positioning means. The mouse may be used by clicking and holding down on it and sliding the mouse to the left or right along the title time-line relative to the desired location of the play-head.

The title window 274 frequently also includes one or more text field(s) 280 for describing the desired text. A position menu 282 permits the user to choose where and how the text is to appear on the frame. For example, the text may be a centered title, appear to bounce through the length of the frame, centered with multiple text lines, centered as a title, letters flying across the frame, words flying, music video, rolling center credits, rolling credits, scroll with a pause, scrolling as a block, typewriter, and the like. A font menu 288 may be used to dictate the character type. An "over black" control 284 may be used to insert an additional black frame at the play-head position and the title over the black frame. An example of a reference element with text over black 285, having the title, "THE END" is shown on time line 240. On the other hand, a "color" control 286 may be used to overlay the text over the current frame. The text may be shown in a preview window 290 by selecting a preview control 292. Preview simulates the edited reference without the edited version being actually saved in storage. An add control 294 may be provided for storing the reference with the title. The reference with edit feature 296 may then be shown on the monitor window 246. The initial clip 01 may be split into reference with edit feature 296 and remaining portion reference 298, as shown on video time line 240.

Figure 5B:
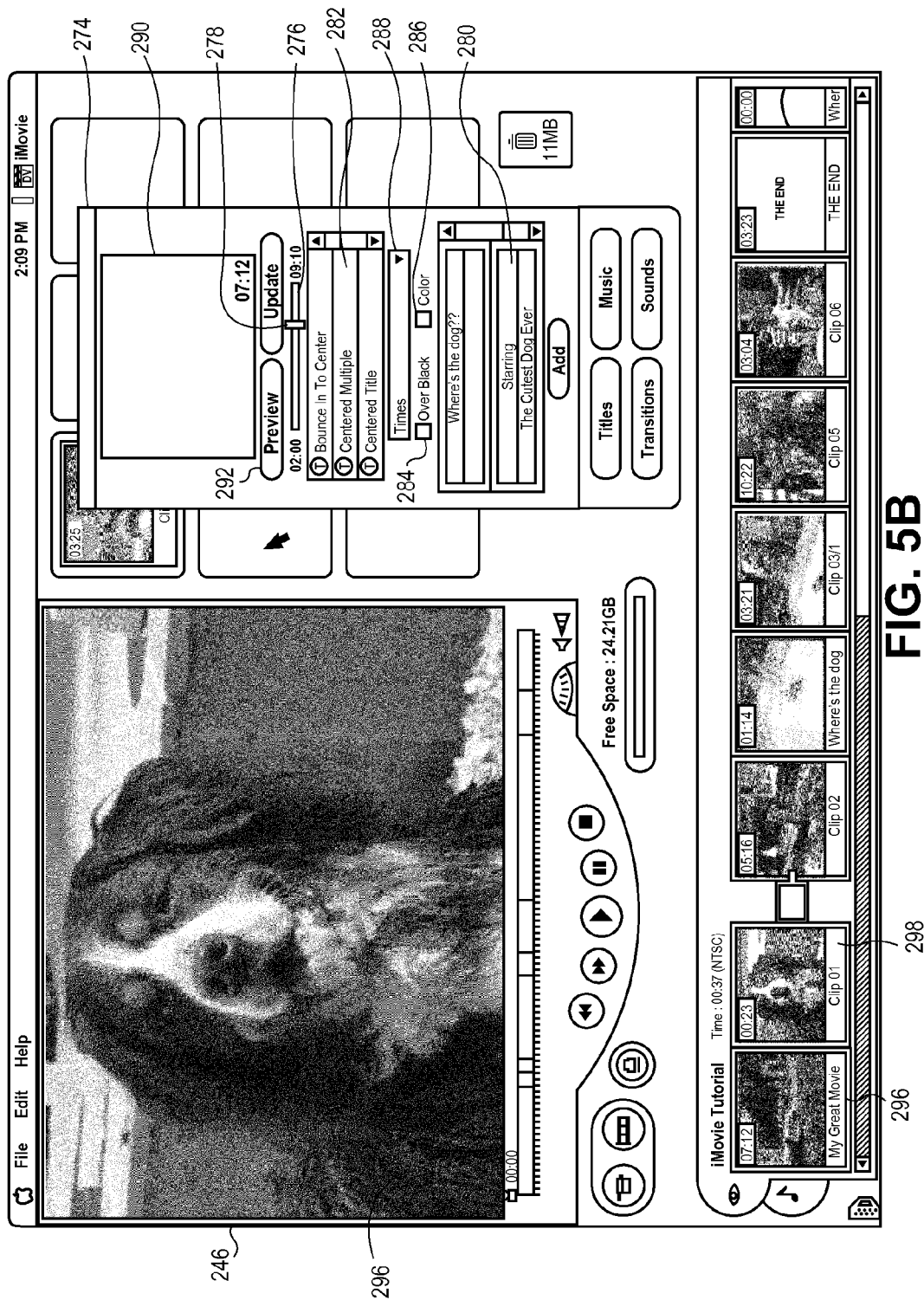
Figure 5C:
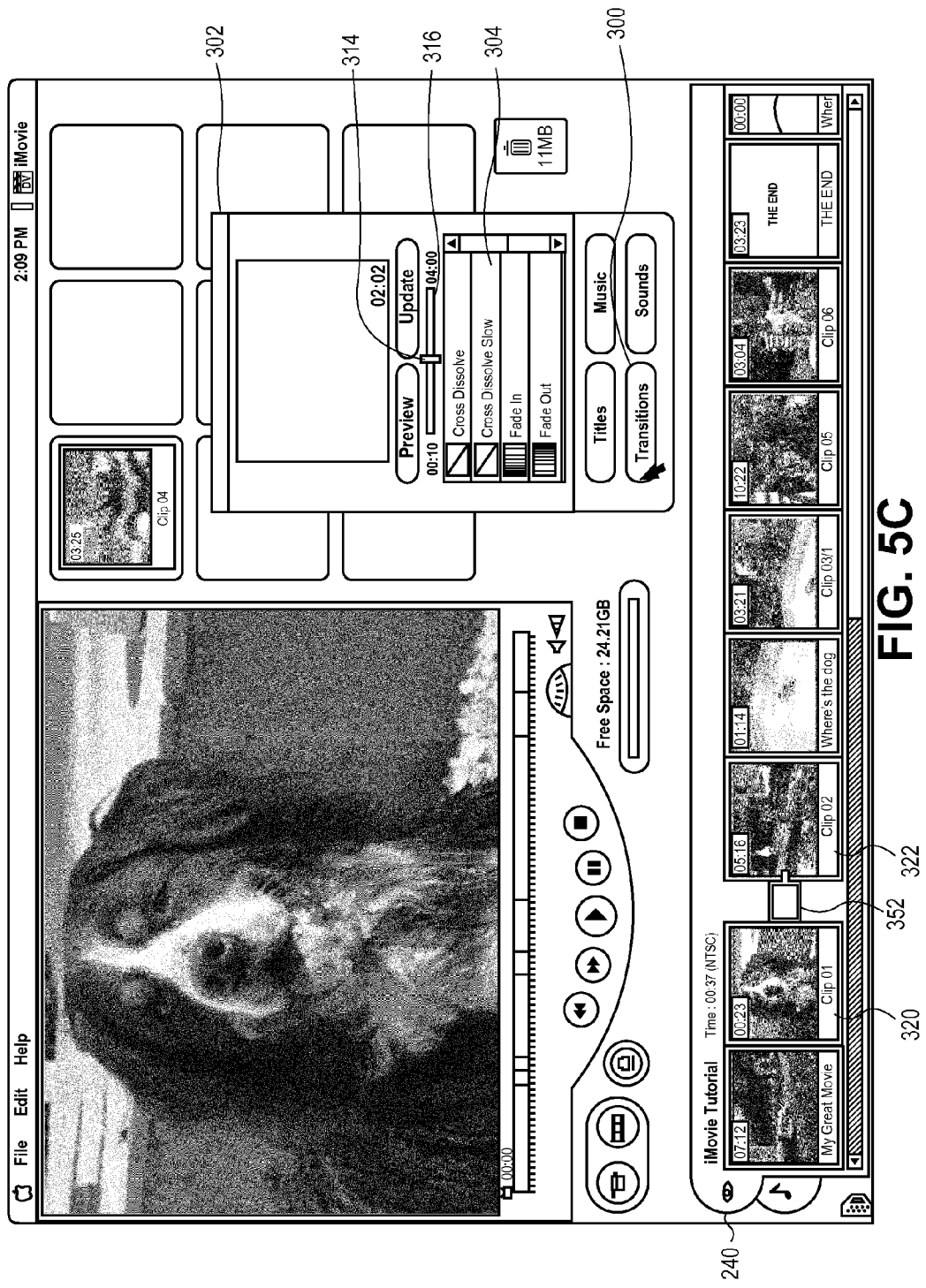

A transition control 300 has instructions for inserting an effect between clips, where selection of the transition control 300 opens a transition window 302, as depicted in FIG. 5C. A transition effects menu 304 permits the user to choose from any one of numerous transition options. Examples of transitions are cross dissolve, cross dissolve slow, fade in, fade out, overlap, push right, slowly push right, scale down, slowly scale down, and the like. The frame location of the play-head 314 along transition time ruler 316 may be positioned by the same or similar manner as described above for introducing titles in a clip. The transition is typically inserted as a frame immediately after the play-head position by reference element with transition 352 and then appears on visual time line 240.

Furthermore, the exemplary edit box 268 shown in FIG. 5A includes music control 330 for incorporating music tracks to the presentation where the music may be recorded by controls in the music control window. Sound control 350 in the edit box 268 is for including sound effect to portions of the presentation. Usually, the sound effects are prerecorded and stored within the processing system. Some examples of sounds are cat meow, dog bark, crickets, crowd applause, trumpets fanfare, wild laugh, water lapping, whistle, thunder, horn honk and footsteps.

As an edit feature is being rendered by the system, a progress bar may be provided to indicate the amount of the desired modification that is completed during the course of the rendering. This progress bar may be a shaded area that grows in length relative to the rendering progress and may be conveniently positioned proximal the reference element that is being rendered. However, the progress bar may be provided on other portions of the GUI and take any form, such as a numerical indicator of the percentage of rendering completed or yet to be finished.

Typically, references are selected, viewed, optionally modified with edit features and transferred to a position on the time line, such as by drag/drop or cut/paste mechanisms. For example, a reference may be selected from the monitor window of an edit sub-window and either cut and pasted into the time line or dragged from the monitor window and dropped into the time line. At any time, particular references may be removed from the presentation and returned to the shelf, also through the drag and drop or cut and paste tools. Where a reference is removed, the references remaining in the presentation shift over in the time line to create a seamless continuation of the presentation.

In addition, where a user does not need a segment of information for the presentation, a clip or portion of a clip may be removed from storage. Entire clips or portions of clips may be deleted by selecting the reference data and dragging it to the trash icon control 370 on the GUI. After depositing the reference data in the trash, the user may activate a delete control. For example, the user may select an "empty trash" e.g. from a pull down menu. In still other embodiments, the user may activate a "cut" command, e.g. from a pull down menu, to have the selected data placed on a paste board. The user may then send delete instructions to the processing system and the data as well as corresponding information is deleted. In another embodiment, an intermediary trash bin or paste board is not used and the user simply elects to delete selected reference data. Other methods for the user to send selection, deletion and trash commands are also possible and intended by the present invention.

Where the system receives such trash and/or delete command from a user input or software instruction or other means, the process manager 66 may respond by deleting the relevant information and references thereof. Furthermore, where the selected data is cut and placed onto a paste board, the process manager may respond to a delete command by deleting the data from the paste board and as well as its associated information.

An optional trash depository 58 may be provided in storage 30, as shown in FIG. 2, to temporarily hold references, reference data, the time based stream of information, or any portions thereof. The contents of the trash depository may be accessed, manipulated, or removed by the processing system. Often, the trash depository 58 serves as a holding bin for unwanted data prior to its deletion from storage. By dropping the data into the trash depository, the user may continue with uninterrupted editing and later empty the trash, i.e., delete the contents and any associated information, at a convenient time. At any time while the reference data is in the trash depository, the processing system may receive a cancel command, such as from the user or other means. In the case of a cancel command, the process manager returns the reference data back to its original location and restores the initial reference, e.g. in and out points, rather than deleting the reference and the information.

The process manager may perform such delete action by directly and permanently eliminating the selected information (and associated reference data) from storage. This direct elimination may take place by the process manager copying over the relevant file. If there is any information occurring prior to or after the eliminated section, the remaining information appears to be continuous and uninterrupted by the copy over the excluded section. In the alternative, the deletion may also take place by changing a virtual file allocation table (VFAT, FAT or FAT32) to indicate that the space that has been used by that file is available for reuse by another file. When new files are written to that space, the deleted data is overwritten and thus, permanently eliminated. Prior to this overwriting, it may be possible for the deletion to be reversible.

In one embodiment, direct elimination of information occurs where the beginning portion or middle portion of a clip in a file is selected for deletion. This elimination may occur by various mechanisms. In one embodiment, the system may copy the portion that is to be preserved into a new file and the old file may be removed. In another instance, the system may simply shift over the preserved data to replace the eliminated data. For example, where units 0-30 are to be eliminated from a clip of 0-40, units 31 to 40 may be moved into the space previously occupied by 0-30, thus creating a clip 0-9. In this manner the header information that may be present in the beginning of a clip may also be preserved.

Where a tail end of a clip in a file is to be deleted, the clip may be merely truncated such that the ending portion is marked as extra space that is available for reuse. Thus, the beginning header information is still present in the file. Furthermore, in order to erase all of a file that is selected for elimination, the deletion may take place by merely marking the entire file as deleted and available for reuse as described above.

In any case, the process manager may also be triggered to perform several relevant routines upon receipt of the delete command. In one embodiment, a reference check method is performed when the system receives a selected information command and a delete command. The process manager responds to the delete command by checking in the reference database to determine if a single or no reference data to the selected information exists. Where the process manager concludes that more than one reference data set to the selected information exists, the process manager fails to eliminate the selected information from storage. Rather than deleting the information from storage, only the selected reference data is deleted. On the other hand, if the process manager establishes that more than one reference data set to the selected information does not exist, the process manager deletes the selected reference data contained within a reference or portion of a reference, if any are such data present in the storage, and also deletes the selected information from storage.

The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

At times, an edited version of the time based stream of information may be produced by the system and stored. The time based stream of information that corresponds to an edited reference is copied into storage. Then, either the original or copy of the information is modified to reflect the edited reference. Thus, the storage includes both the original time based stream of information and edited version of the information.

The total amount of storage space available for new files is determined by a space monitor 68. Space monitor 68 is coupled to storage 30 through bus 22. When a new file is created to hold information, the space monitor ascertains the amount of space that is utilized by the new file and subtracts this consumed space to recalculate the remaining amount of space in storage.

In one configuration of processing system 12, a means for communicating with an information source that has a time based stream of information is provided. For example, bus 22 additionally couples detector 24 to the processor 26. The processing system may detect a connection between the processing system and the information source through detector 24. The detector 24 performs an inquiry as to whether an information source is in communication with the processing system. The detector determines a connection with the information source by sensing particular signals, such as electrical current output, that are released from the information source, and usually when the source is energized, i.e. "turned-on." The detector may be further configured to conduct periodic checks for communication with the information source.

Means are provided for capturing the time based stream of information from the information source, such as a capture card or other capture mechanisms. The transfer rate of the information entering the system is usually the same or substantially the same speed that the information runs prior to entering the system, such as the rates established by the video standards of various regions, such as NTSC and PAL. For example, movie film usually runs with a speed of 24 fps.

The information may be captured and written into storage by various mechanisms. One capture mechanism is a sequential-type method in which an application procedure is executed when the processing system is in capture mode. In one stage of the application procedure, signals from an information source are captured. The system reads the information, shows the information on the display and writes the information to a storage medium. However, when control elements are activated, the system moves away from the capture step and switches to another stage that includes a process control commands loop for handling the control instructions. The CPU of a system employing such a sequential-type method is dedicated to processing the control commands. While application procedure is in the process control command loop, the capturing operation ceases and the processing system stops communicating with the information source. During this period, the information that is released from the information source does not get loaded into the system. Rather, the processing of control commands continues through to completion, at which time, the capturing step may continue.

Another capture mechanism, according to the present invention, is a low-level interrupt-type method, which effectively permits intermittent processing of control element commands while, at the same time, loading the time-based information. With the interrupt-type method, in addition to the capture application, a user may run any software applications, e.g. network communication protocols, such as Appletalk, Internet or e-mail applications, word processing applications, etc.

An interrupt-type method includes an application procedure that may be executed when the processing system is in capture mode and when it is not in capture mode, e.g. when the system is in edit mode. Where the processing system is operating in a non-capture mode, the application procedure conducts normal operations, such as processing of control commands from control elements. However, when the capture mode is indicated, the interrupt procedure fires the appropriate capture tasks and causes a temporary suspension of the application procedure in an asynchronous manner. Thus, the processing of control commands proceeds until the capture process interrupts the other application tasks.

This interrupt procedure may be performed at periodic intervals and are certain to iterate at regular times, despite the activities, e.g. processing of control commands, of the application procedure. The interrupt procedure includes a quick reading of incoming information, copying the information into a proxy, outputting the information and writing it into storage where the information may be further edited by use of the control elements. The interrupt procedure is advantageous in that the process is very quickly performed and rapidly repeats. The time for performance is less than the transfer rate of the information entering the system.

The repetitions of the interrupt procedure occur at a rate that is substantially similar to or the same as the transfer rate. Thus, all of the information may be read and stored while still processing control commands in-between each of the iterations of the interrupt procedure. As a result, the user does not recognize the interruptions and the capture process as well as other instructions appear to be simultaneously executed by the system. Moreover, the interrupt procedure guarantees that information is not omitted from the reading step because the iterations of the interrupt image being absent from a reconstructed image after a compression-decompression cycle, whereas loss-less schemes do not drop any information.

Low compression schemes (i.e., those that do not provide significant compression ratios) that may be used include joint photographic experts group (JPEG) compression schemes that use Fourier analysis-based methods, such as the discrete cosine transform, to compress data; graphics interchange format (GIF) compression schemes, which use LZW algorithms; bitmapped image compression schemes and tagged image file format (TIFF) compression schemes, etc. Alternatively, high efficiency compression schemes, such as wavelet, motion wavelet, Motion Picture Experts Group (MPEG) motion JPEG, Lempel Ziv and/or fractal compression schemes, etc., may be employed. Use of high efficiency schemes may be preferred where storage space is limited. For example, wavelet compression schemes may be 20 times more efficient than JPEG compression schemes, providing for a more detailed representation of the data at the same bit budget. Once the time based information is captured and stored, it may be referenced for editing and generating a presentation.

In addition to the features described above, the processing system may further include alternative aspects that enhance ease and convenience of use. For example, referring again to FIG. 2, the information source 80 may be controlled through the processing system 12. Source controls operate the information source 80, usually where no digital converter 82 is employed as an intermediate between the information source and processing system. The source controls may be presented on the GUI. In one embodiment, the output controls 248, as shown in FIG. 5A also serve as the source controls to direct the monitor window views at one time and send action commands to the information source 80 at another time. Thus, the source controls may include rewind control 252, forward control 254, play control 250, pause control 258 and stop control 256.

Software Overview

Figure 6:
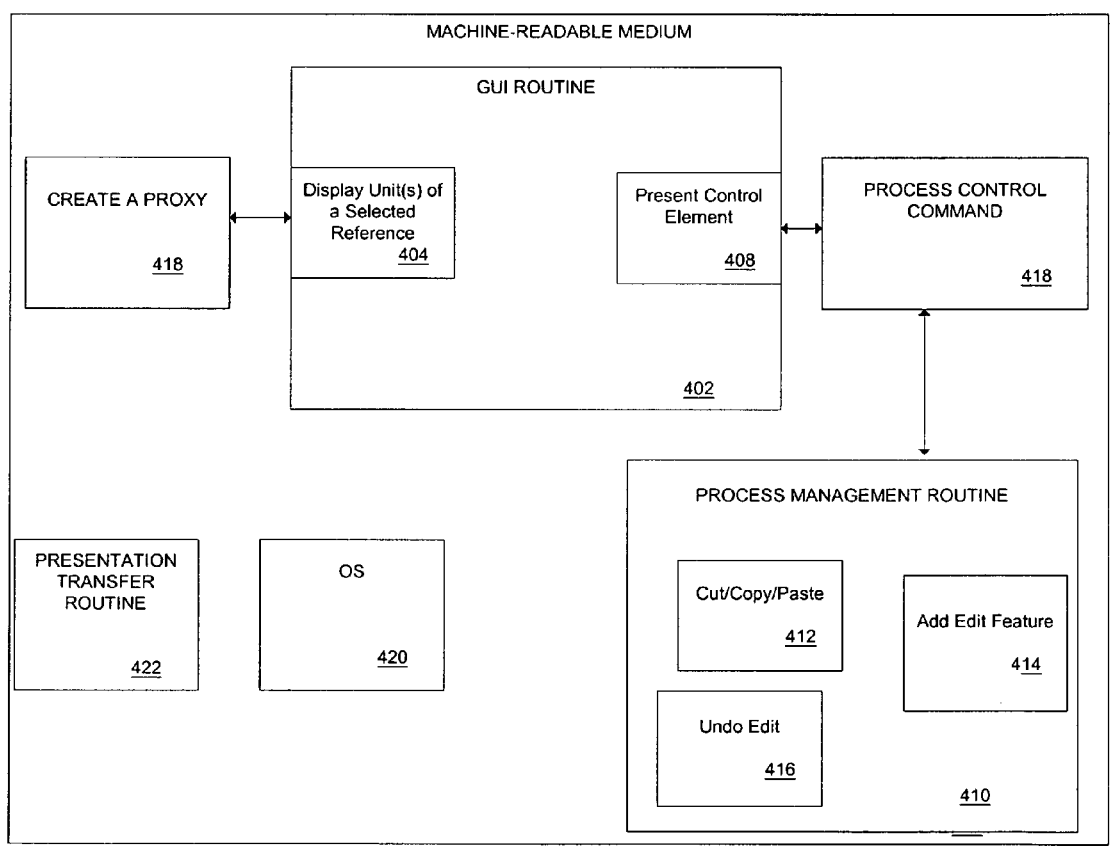
FIG. 6 is a block diagram of a machine-readable medium storing executable code and/or other data to provide one or a combination of mechanisms for processing a time based stream of information, configured in accordance with one embodiment of the present invention.

Various software components, e.g. editing application program, may be provided within or in communication with the system that cause the processor to execute the numerous methods employed in creating the presentation. FIG. 6 is a block diagram of a machine-readable medium storing executable code and/or other data to provide one or a combination of mechanisms for collecting and manipulating procedure and length of time to perform are timed to correspond with the rate of information transfer from the information source.

For transfer of NTSC video, the interrupt procedure iterations are typically at least every $1/29$ to $1/30$ second and more usually 1/29.97 second to $1/30$ second. For PAL systems (systems used in parts of Europe, China and Hong Kong), the frame rate is 25 fps and thus interrupt procedure is substantially at least every $1/25$ second. In general, the interrupt procedure should iterate close to the transfer rate or slightly faster than the transfer rate, e.g. within at least $1/10$th second of the transfer rate and more typically within $1/100$th second. The iterations should not be slower than the transfer rate and the iterations are usually at the rate that corresponds to the frame rate of video standard.

Usually, the processing system according to the present invention, outputs the information, e.g. depicts the information on the display at a rate (the "output rate") that is substantially similar to the rate in which each unit of the information, e.g. frame of video, is arriving from the information source (the "transfer rate"). In contrast with prior systems, where low quality displaying (i.e. considerably lower than the transfer rate, such as 30 to 70% of the transfer rate) is used to devote more of the system to capture, the present invention may use high quality (i.e. the same or substantially similar to the transfer rate, such as greater than 70% and more usually 93 to 100% of the transfer rate) because all of the information is certain to be stored by the interrupt procedure. The speed at which the information is displayed depends on numerous factors, such as side operations being simultaneously performed by the system, e.g. network access and CD ROM detection, image quality, e.g. based on decompression schemes employed, and processor speed or graphic acceleration. For example, where the transfer rate is about 30 frames per second (fps), the corresponding output rate of the present invention is usually 29 to 30 fps. The transfer rate depends on the particular transfer rate standard employed, as described in detail below. The resulting capture output is of high quality that is similar to the quality of the information residing in the information source.

During the capture process, the time based stream of information is written into storage to be referenced while creating the presentation. For convenience, the stored information may be compressed to conserve storage space. Generally, compression formats are either high efficiency or low efficiency and either loss-less or lossy. Lossy compression schemes are characterized by components of an original the time based stream of information, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, dynamic random access memory, static RAM, flash memory, etc. Various subroutines may also be provided. These subroutines, such as functions of the proxy editor may be parts of main routines or added as plug-ins or Active-X controls.

The machine readable storage medium 400 is shown storing a GUI routine 402, which, when executed, provides a layered GUI for display of tools and output regarding the time based stream of information, such as the GUI 230 shown in FIGS. 5A-5C. The GUI routine 402 includes a number of mechanisms for playing or otherwise displaying the time based stream of information.

One subroutine is for display of the units of a selected reference 404, which may be managed by a display control. This showing of units may include a proxy of rendered edit features as well as some unmodified units of the selected reference during rendering of edit features, as described in regards to FIG. 4. Furthermore, the GUI routine also includes a present control elements subroutine 408 to permit control elements to be visible on the display.

The medium 400 also has a routine for creating a proxy of rendered unit(s) 406. The proxy data so produced may be fed to the display of the GUI routine 402 and the display of units subroutine 406. The generating of the proxy by routine 406 is described above in regard to FIG. 4.

In addition, process control command routine 418 that directs the carrying out of various commands, such as for manipulating information and constructing a presentation. The control commands may be generated by activation of control elements by the user. Upon receipt of the control commands, the process control command 418 may send instructions to the GUI Routine 402 to specify particular information to be presented or manner of presenting information. The process control command 418 routine may also send the commands to a process management routine, such as an add edit feature command, undo command, delete command, select information command, cancel delete command, and the like, as described below.

The medium also has a process management routine 410 that may have various subroutines for conducting various tasks related to editing and carrying out instructions from the process control command routine 418. One such subroutine is a cut/copy/paste subroutine 412, which when executed, references or portions thereof are cut, copied and/or pasted into a presentation. The process management routine 410 may be also configured for conducting an add edit feature subroutine 416 to include particular edit features to references for use in a presentation. An undo edit subroutine 414 may optionally be included whereby certain edit tasks may be undone to reclaim the unmodified version of data.

Other software components may include an operating system 420 and a presentation transfer routine 422 that facilitates communication of information from the processing system, such as via external player 84. Various modes of transfer are described above with reference to the external player 84 in FIG. 2.

The software components may be provided in as a series of computer readable instructions. When the instructions are executed, they cause a processor, such as through a browser to perform the capture and editing steps as described. For example, the instructions may cause a processor to communicate with an information source, provide capture information from the time based stream of information on a first portion of a display, provide process information for constructing the presentation on a second portion of the display; and provide at least one enabled control element. Such instructions may be presented to the processor by various mechanisms, such as a plug-in, ActiveX control, through use of an applications service provided or a network, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described information transfer system as well as methods of its use without departing from the broad scope of the invention. Therefore, the following claims and their legal equivalents should determine the scope of the invention.

What is claimed is:

1. A method for manipulating a time based stream of information in a processing system, the method comprising:
   determining, by a processor, whether an original frame of the time based stream of information requires one or more modifications;
   if it is determined that the original frame requires the one or more modifications, rendering the one or more modifications to the original frame by a process manager that includes adding an edit feature to the original frame to create a revised frame, and storing the edit feature added to the original frame in a file for the revised frame; automatically creating a proxy which is a pseudo rendered version of the revised frame by a proxy editor while still performing the rendering the one or more modifications to the original frame by the process manager, the proxy including a simulation of the rendered one or more modifications that includes the added edit feature to the original frame; sending the proxy to a display device; displaying, by the display device, the proxy of the revised frame during the rendering the one or more modifications to the original frame; and
   if it is determined that the original frame does not require the one or more modifications, displaying the original frame of the time based stream of information.

2. The method of claim 1, further including retrieving the original frame of the time based stream of information in response to a user edit command and sending instructions for creating the proxy of the revised frame if it is determined that the original frame requires the modification.

3. The method of claim 1, wherein the creating of the proxy is by drawing an imitation of the edit feature.

4. The method of claim 3, wherein the edit feature is text and the imitation includes simulated character, size and font.

5. The method of claim 1, wherein the process manager has instructions for adding the edit feature to the original frame and the process manager is separate from the proxy editor that has instructions for creating the proxy of the revised frame.

6. The method of claim 5, wherein the proxy editor is a plug-in or ActiveX control.

7. The method of claim 1, wherein the displaying of the proxy is at a rate that is substantially less than the play rate of the time-based stream of information.

8. The method of claim 1, wherein the presentation has one or more references that have data on how to manipulate the time based stream of information.

9. A digital processing system comprising:
   A) a capture port for acquiring a time-based stream of information;
   B) a storage;
   C) a display; and
   D) a processor that is coupled to the capture port and to the storage and to the display and wherein the processor is configured to
      determine whether an original frame of the time-based stream of information requires one or more modifications; if it is determined that the original frame requires the one or more modifications,
      to render the one or more modifications to the original frame by a process manager that includes adding an edit feature to the original frame to create a revised frame; and storing the edit feature added to the original frame in a file for the revised frame; to automatically create a proxy which is a pseudo rendered version of the revised frame by a proxy editor while still performing the rendering the one or more modifications to the original frame by the process manager, the proxy including a simulation of the rendered one or more modifications, that includes the added edit feature to the original frame; to send the proxy to a display; to display the proxy of the revised frame during the rendering of the one or more modifications to the original frame; and
      if it is determined that the original frame does not require the one or more modifications, display the original frame of the time-based stream of information.

10. The system of claim 9, wherein the processor is further configured to retrieve the original frame of the time-based stream of information in response to a user edit command and to send instructions for creating the proxy if it is determined that the original frame requires the modification.

11. The system of claim 9, wherein the creating of the proxy is by drawing an imitation of the edit feature.

12. The system of claim 11, wherein the edit feature is text and the imitation includes simulated character, size and font.

13. The system of claim 9, wherein the process manager has instructions for adding the edit feature to the original frame and the process manager is separate from the proxy editor that has instructions for creating the proxy of the revised frame.

14. The system of claim 13, wherein the proxy editor is a plug-in or ActiveX control.

15. The system of claim 9, wherein the displaying of the proxy is at a rate that is substantially less than the play rate of the time-based stream of information.

16. The digital processing system of claim 9, wherein the presentation has one or more references that have data on how to manipulate the time based stream of information.

17. A processing system for generating a presentation of a time-based stream of information comprising:
   means for determining whether an original frame of the time based stream of information requires one or more modifications;
   means for rendering the one or more modifications to the original frame by a process manager that includes means for adding an edit feature to the original frame to create a revised frame; and means for storing the edit feature added to the original frame in a file for the revised frame;

means for automatically creating a proxy which is a pseudo rendered version of the revised frame by a proxy editor while still performing the rendering the one or more modifications to the original frame by the process manager, the proxy including a simulation of the rendered one or more modifications to the original frame that includes the added edit feature to the original frame;

means for sending the proxy to a display device during the rendering the one or more modifications to the original frame; means for displaying the proxy of the revised frame during the rendering the one or more modifications to the original frame if it is determined that the frame does not require the modification, wherein the means for displaying includes the display device; and means for displaying the original frame of the time based stream of information if it is determined that the original frame does not require the one or more modifications.

18. The system of claim 17 further including means for retrieving the original frame of the time-based stream of information in response to a user edit command; and means for sending instructions for creating the proxy of the revised frame if it is determined that the original frame requires the modification.

19. The system of claim 17, wherein the creating of the proxy is by drawing an imitation of the edit feature.

20. The system of claim 19, wherein the edit feature is text and the imitation includes simulated character, size and font.

21. The system of claim 19, wherein the means for creating a proxy is a plug-in or ActiveX control.

22. The system of claim 17, wherein the displaying of the proxy is at a rate that is substantially less than the play rate of the time-based stream of information.

23. A computer readable medium storing therein a plurality of sequences of executable instructions, which, when executed by a processing system for collecting a time based stream of information and generating a presentation, cause the processing system to:

determine whether an original frame of the time based stream of information requires one or more modifications;

if it is determined that the original frame requires the modification, render the one or more modifications to the original frame by a process manager that includes adding an edit feature to the original frame to create a revised frame, and storing the edit feature added to the original frame in a file for the revised frame; create a proxy which is a pseudo rendered version of the revised frame by a proxy editor while still performing the rendering the one or more modifications to the original frame by the process manager, the proxy including a simulation of the rendered one or more modifications that includes the added edit feature to the original frame;

send the proxy to display during the rendering the one or more modifications to the original frame;

display the proxy of the revised frame during the rendering the one or more modifications to the original frame; and display the original frame of the time based stream of information if it is determined the original frame does not require the one or more modifications.

24. The computer readable medium of claim 23, further including additional sequences of executable instructions, which, when executed by the processor, cause the processor to retrieve the original frame of the time based stream of information in response to a user edit command and send instructions for creating the proxy of the revised frame if it is determined that the original frame requires the modification.

25. The computer readable medium of claim 23, wherein the creating of the proxy is by drawing an imitation of the edit feature.

26. The computer readable medium of claim 25, wherein the edit feature is text and the imitation includes simulated character, size and font.

27. The computer readable medium of claim 23, wherein the instructions for adding the edit feature to the original frame is in the process manager that is separate from the proxy editor that has instructions for creating the proxy of the revised frame.

28. The computer readable medium of claim 23, wherein the displaying of the proxy is at a rate that is substantially less than the play rate of the time-based stream of information.

29. A method to manipulate a time based stream of information, comprising:

receiving an edit command by a processor;

retrieving a first frame of time based stream of information;

determining whether the first frame requires a modification according to the edit command;

adding an edit feature to the first frame by a process manager if the first frame requires the modification to create a second frame;

storing the edit feature in a file for the second frame by a process manager;

creating a proxy which is a pseudo rendered version of the second frame by a proxy editor that includes a simulation of the added edit feature to the first frame, wherein the creating the proxy is performed while still continuing to add the edit feature to the first frame and store the edit feature added to the first frame in the file for the second frame by the process manager;

displaying the proxy of the second frame while still continuing to add the edit feature to the first frame and store the edit feature added to the first frame in the file for the second frame if it is determined that the first frame requires the modification; and displaying the first frame of the time based stream of information if it is determined that the first frame does not require the modification.

30. The method of claim 29, further comprising:

determining whether the first frame is displayed; and skipping the displaying of the proxy of the second frame, if the first frame is displayed.

31. A system to manipulate a time based stream of information, comprising:

means for receiving an edit command;

means for retrieving a first frame of time based stream of information;

means for determining whether the first frame requires a modification according to the edit command;

means for adding an edit feature to the first frame to create a second frame by a process manager, and means for storing the edit feature in a file for the second frame by the process manager, if the first frame requires the modification;

means for creating a proxy which is a pseudo rendered version of the second frame by a proxy editor that includes a simulation of the added edit feature to the first frame, wherein the creating the proxy is performed while still continuing the adding of the edit feature to the first frame and storing the edit feature in the file for the second frame by the process manager;

means for displaying the proxy of the second frame while continuing the adding the edit feature to the first frame if it is determined that the first frame requires the modification; and means for displaying the first frame of the time based stream of information if it is determined that the first frame does not require the modification.

32. The system of claim 31, further comprising:

means for determining whether the first frame is displayed; and means for skipping the displaying of the proxy of the second frame, if the first frame is displayed.

33. A computer readable storage medium to manipulate a time based stream of information, the computer readable storage medium storing instructions thereon, which, when executed by the computer, cause the computer to perform operations comprising:

receiving an edit command;

retrieving a first frame of time based stream of information in response to the edit command;

determining whether the first frame requires a modification according to the edit command;

adding an edit feature to the first frame to create a second frame by a process manager;

storing the edit feature in a file for the second frame by the process manager, if the first frame requires the modification;

creating a proxy which is a pseudo rendered version of the second frame by a proxy editor that includes a simulation of the added edit feature to the first frame, wherein the creating the proxy is performed while still continuing the adding of the edit feature to the first frame and storing the edit feature added to the first frame in the file for the second frame by the process manager;

displaying the proxy of the second frame while still continuing the adding the edit feature to the first frame and storing the edit feature added to the first frame in the file for the second frame; and displaying the first frame of the time based stream of information if it is determined that the first frame does not require the modification.

34. The computer-readable storage medium of claim 33, wherein the instructions further cause the computer to perform operations, comprising:

determining whether the first frame is displayed; and skipping the displaying of the proxy of the second frame, if the first frame is displayed.

35. A system to manipulate a time based stream of information, comprising:

a processor, and a memory coupled to the processor, wherein the processor is configured to receive an edit command; to retrieve a first frame of time based stream of information in response to the edit command; to determine whether the first frame requires a modification according to the edit command; to add an edit feature to the first frame to create a second frame by a process manager; and store the edit feature added to the first frame in a file for the second frame by the process manager, if the first frame requires the modification; to create a proxy which is a pseudo rendered version of the second frame by a proxy editor that includes a simulation of the added edit feature to the first frame, wherein the proxy is created while still continuing to add the edit feature to the first frame by the process manager; and store the edit feature added to the first frame in the file for the second frame; and to display the proxy of the second frame while still continuing to add the edit feature to the first frame and store the edit feature added to the first frame in the file for the second frame; and to display the first frame of the time based stream of information if it is determined that the first frame does not require the modification.

36. The system of claim 35, wherein the processor is further configured to determine whether the first frame is displayed; and to skip the displaying of the proxy of the second frame, if the first frame is displayed.

\* \* \* \* \*